United States Patent
Akers

[11] 3,908,129
[45] Sept. 23, 1975

[54] MANOMETER LEVEL DETECTOR

[75] Inventor: Robert F. Akers, Fountain Valley, Calif.

[73] Assignee: Datagage Systems, Inc., Fountain Valley, Calif.

[22] Filed: Apr. 8, 1974

[21] Appl. No.: 458,867

[52] U.S. Cl. ............... 250/577; 250/341; 250/357; 250/574
[51] Int. Cl.² ........................................ G01N 21/24
[58] Field of Search .......... 250/338, 341, 357, 573, 250/574, 577, 552

[56] References Cited
UNITED STATES PATENTS

| | | | |
|---|---|---|---|
| 2,984,148 | 5/1961 | Vollmer | 250/357 X |
| 3,411,005 | 11/1968 | Taylor | 250/338 |
| 3,454,759 | 7/1969 | Calhoun | 250/577 X |
| 3,636,360 | 1/1972 | Oishi et al. | 250/577 |

*Primary Examiner*—Archie R. Borchelt
*Attorney, Agent, or Firm*—Jessup & Beecher

[57] ABSTRACT

A refractive sensing unit is provided for use with manometer gages, or the like, and which may be set to monitor the liquid in the manometer at any particular level. The unit responds to the refraction of light passing through the liquid, so as to exhibit high immunity to interference from ambient light, and to be capable of performing its function in conjunction with translucent manometer liquids. The sensing unit is attached to the manometer tube by means of a clip which enables the unit to be moved up and down the tube to any desired detecting level, and it does not interfere with the conventional visual readings of the usual graduated scale strip mounted adjacent the tube. A light source is mounted in the sensor unit, together with a photoelectric transducer, and these elements are fixed at an angle to one another so that light reaches the transducer from the light source only when the effective refractance of the manometer tube produces the correct deflection of the light from the source to be directed to the transducer. A sensitive electronic detector circuit is provided which operates in conjunction with the sensing head to activate an alarm, or other appropriate visual or aural indicator, when the manometer liquid falls below or rises above the monitored level.

4 Claims, 4 Drawing Figures

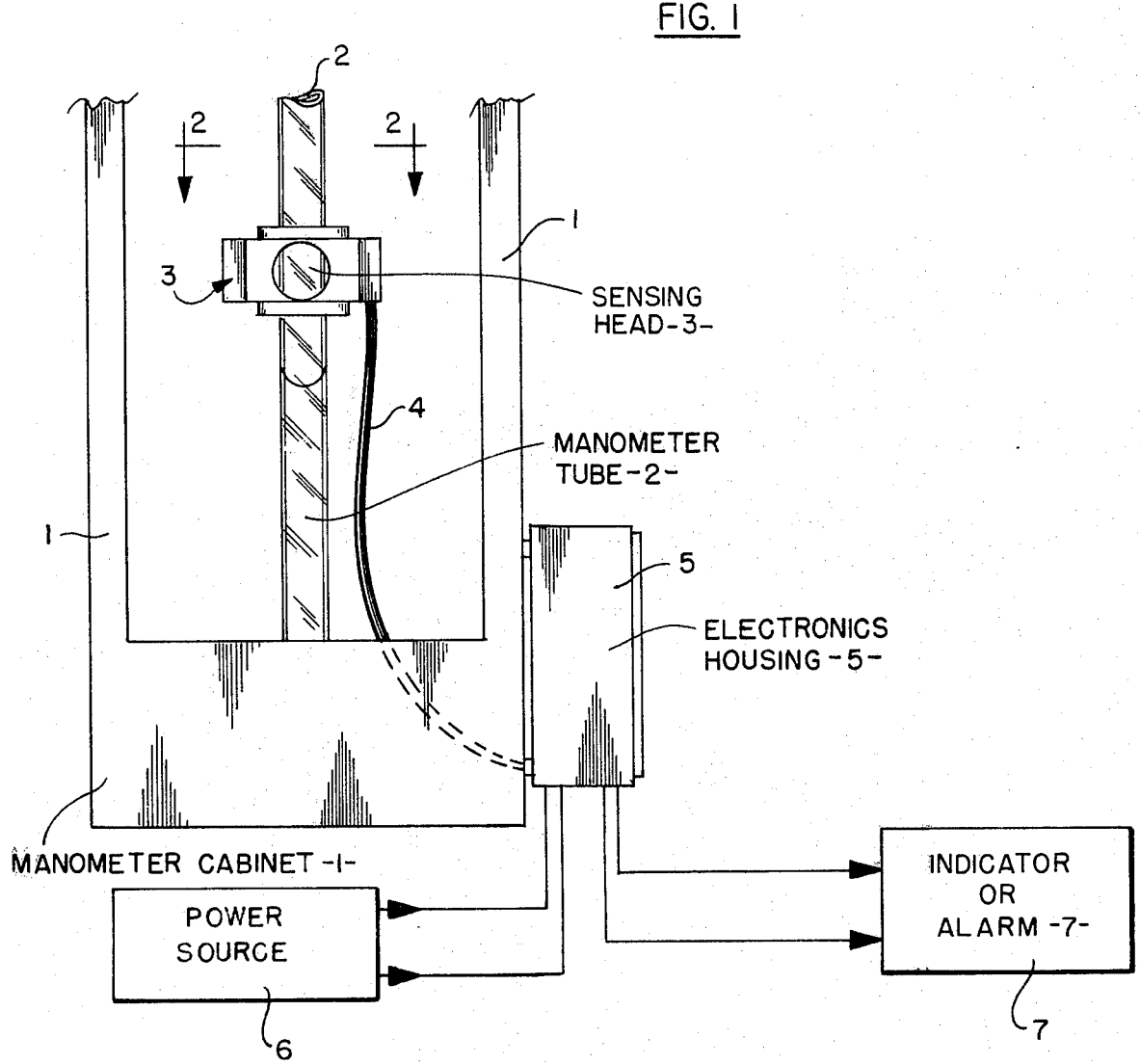
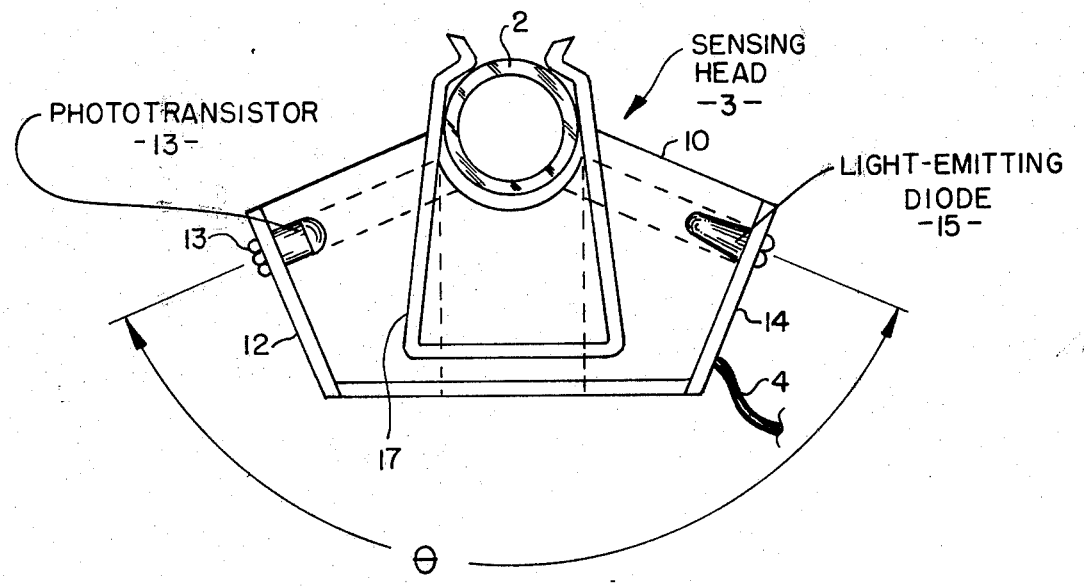

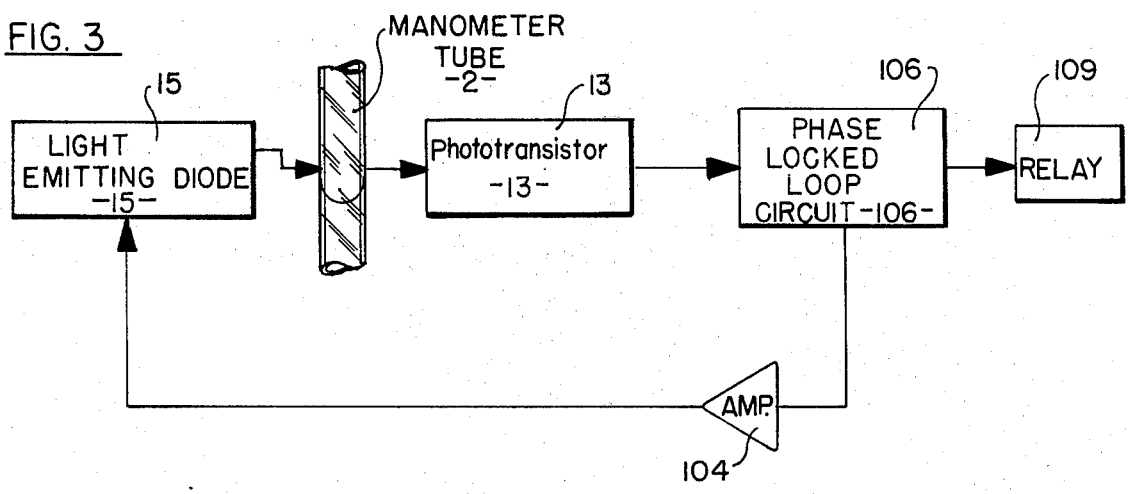
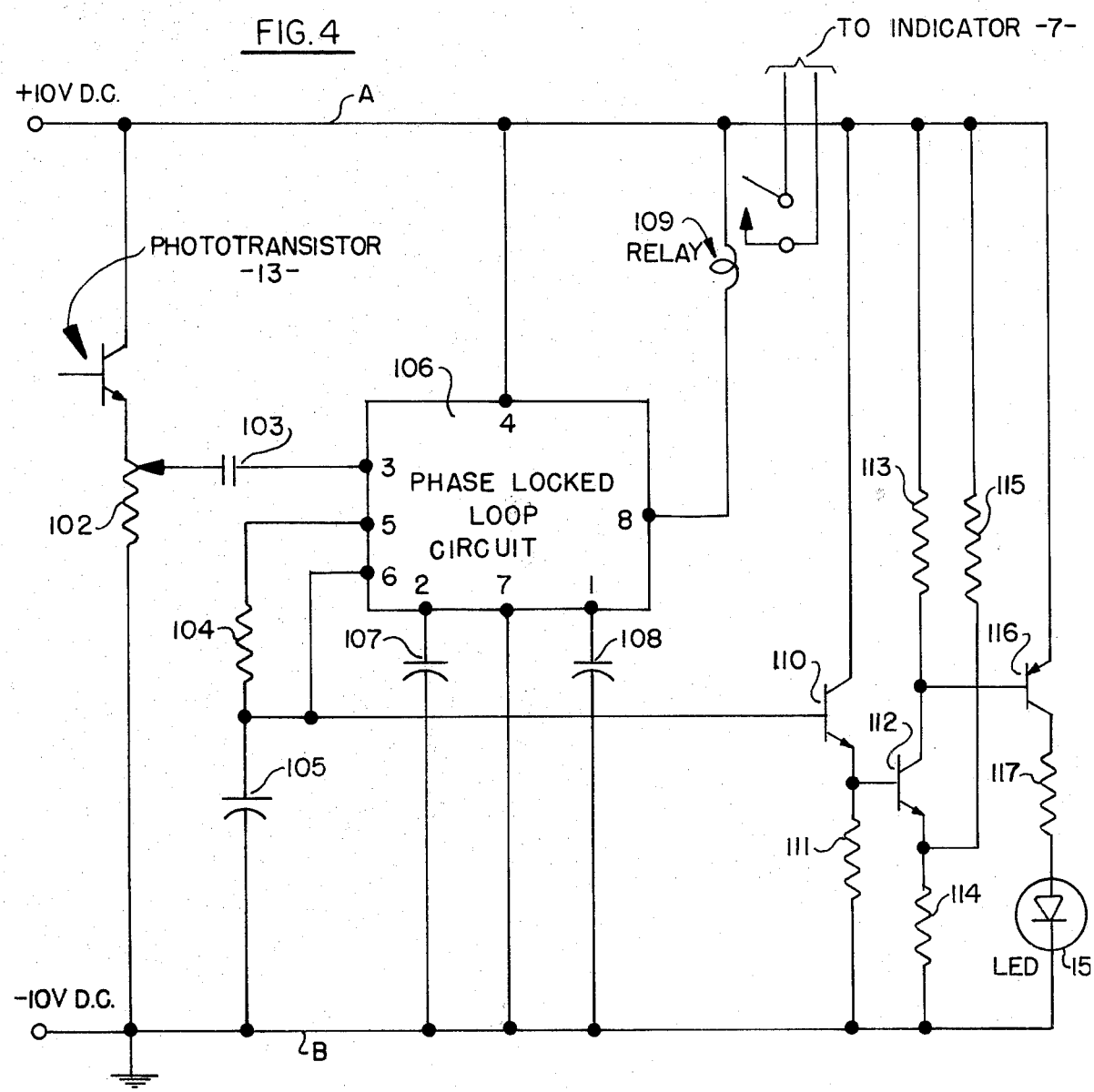

MANOMETER LEVEL DETECTOR

BACKGROUND OF THE INVENTION

The prior art manometer is a double-legged liquid volume gage which is used to measure the difference between two fluid pressures. It is the basic standard for the measurement of small differential pressures. Two principal types of manometers are the glass-tube manometer which uses a translucent liquid, such as water, for the simple indication of pressure differentials; and the metallic-housed mercury manometer, which is used to record pressure difference or fluid flow. A scale strip is commonly mounted between the legs of the manometer.

Optical sensors have been provided in the past for sensing slight changes in the level of the liquid column in the manometer. These prior art sensors, for the most part, cause a beam of light to be passed through the manometer tube to a photocell on the opposite side of the tube. The light beam is blocked by the liquid in the tube unless the liquid falls below the monitored level. Such prior art sensors are incapable of sensing the manometer level when a translucent liquid is used. Moreover, the prior art sensors are, for the most part, susceptible to interference by ambient light. Problems have also been encountered in the prior art in providing an appropriate attachment for the optical sensing unit to the manometer tube because of the extreme space limitations imposed by the graduated scale strip used for the visual reading of the manometer.

The improved optical sensing unit of the present invention has an advantage in that it is highly immune to interference from ambient light; and also in that it is capable of detecting a selected liquid level in the manometer, regardless of whether the manometer liquid is opaque (such as mercury) or translucent (such as water). The unit of the invention provides a simple and inexpensive refractive optical sensor which utilizes a minimum number of component parts, and which is capable of detecting the level of all types of manometer liquids of any color or density, and either opaque or translucent; and which is capable of performing its detecting function with a high immunity to interference from ambient light.

The sensing unit of the invention has a mechanical configuration and size which permits it readily to be attached to the manometer tube, and readily to be adjusted along the tube to any desired level. The sensor of the invention, therefore, is capable of reading the manometer at any pre-selected level, and of introducing an electrical signal to a remote indicator, or alarm, whenever the liquid in the manometer passes the monitored level.

The light source in the sensing unit of the invention, may for example, be a light-emitting diode with an integral beamforming lens, and with the color of the resulting light beam being preferably in the red or near-infrared region of the spectrum. The photoelectric transducer used in the sensing unit of the invention, may for example, be a phototransistor whose polar response pattern is restricted to a few degrees, and whose spectral sensitivity is centered in the red or near-infra-red region. The light-emitting diode and the phototransistor are mounted in the sensing unit and are held thereby in a fixed critical angular relationship. The relationship is such that the phototransistor is optimally responsive to changes in light level resulting from changes in the angle of refraction induced in the optical path by the presence of the manometer liquid, as illuminated by the focused energy from the light-emitting diode.

A simple and sensitive electronic detector circuit is used in conjunction with the sensing unit described above, and it responds to the electrical output of the phototransistor to produce an electrical output signal for introduction to the remote indicator or alarm.

The electronic system is designed to be sensitive to minute changes in the effective refraction in the optical path. The particular electronic detector circuit to be described uses a phase-locked-loop (which may be an integrated circuit), and amplifier. The light-emitting diode and phototransistor of the sensing unit are interposed in the feedback path of the phase-lock-loop circuit and amplifier, as also will be described. The phase-locked-loop circuit, the amplifier, and associated circuitry, together with an appropriate power supply and control relay, may be housed in a small enclosure attached to the side of the manometer housing.

The use of a spectral response of the phototransistor in the red or near-infra-red region constitutes a substantial contribution to the overall immunity of the sensor from any effects of room illumination. In addition, the critical angle in which the light source and light-sensitive detector are held by the sensing unit in relationship with the manometer tube also constitutes a substantial contribution to the immunity of the system from the effects of extraneous illumination. In addition, the utilization of the phase-locked-loop circuit and amplifier, together with the above-mentioned light source and detector as elements of an energy chain, makes the largest contribution in the sensor to immunity from outside sources of illumination. This is in addition to the provision of a detector exhibiting high sensitivity to minute changes in energy resulting from the presence or absence of the manometer liquid in the optical path.

BRIEF DESCRIPTION OF THE DRAWINGS

FIG. 1 is a a partial side elevation, of a typical manometer gage, and illustrating a sensing head mounted on the gage and an electronic housing mounted on the cabinet, and which embody the concepts of the invention;

FIG. 2 is a top plan view of the sensing head of FIG. 1, taken essentially along the line 2—2 of FIG. 1, and on an enlarged scale with respect to the representation of FIG. 1;

FIG. 3 is a block diagram of the electronic detector system which is housed in the housing of FIG. 1; and FIG. 4 is a circuit diagram of the electronic detector system of FIG. 3.

DETAILED DESCRIPTION OF THE ILLUSTRATED EMBODIMENT

The manometer gage shown in FIG. 1 includes a cabinet 1 and a vertical glass tube 2. In accordance with the invention, a sensing head 3 is mounted on the tube 2, and it may be moved up and down the tube to any desired sensing level.

An electric cable 4 connects the electric output from the sensing head 3 to an electronic housing 5 which is conveniently mounted on the side of the cabinet. The electronic circuitry in the housing 5 is energized by alternating-current power from an appropriate power source 6. The electronic circuitry produces an output signal which is introduced to an aural or visual indicator or alarm, as represented by the block 7.

The cable 4 may be a flexible, small diameter, four conductor cable which may be of the retractile type. The cable passes through the manometer cabinet 1 to the electronic circuitry mounted in the housing 5. The power source 6 provides, for example, alternating-current power to the electronic circuitry in the housing, and the circuitry includes a usual direct-current power source which is energized by the alternating-current power. In the illustrated embodiment, the output signals from the electronic circuitry in the housing 5 are introduced to a remote aural or visual indicator or alarm 7. The unit 7, for example, may take the form of appropriate indicator lights, or an electrically energized audible alarm. If desired, the indicator lights may be mounted directly on the housing 5, as may the audible alarm.

The sensing head 3, as shown in the enlarged plan view of FIG. 2, includes a body 10 which preferably is transparent or translucent, and which may be molded or fabricated from clear translucent acrylic, or other appropriate material. The body 10 supports a pair of printed circuit boards 12 and 14 in a precise predetermined angular relationship. A phototransistor 13 is mounted on the circuit board 12, and a light-emitting diode 15 is mounted on the circuit board 14, and these elements are connected to the electric cable 4 through appropriate electric connections on the circuit boards. The circuit boards 12 and 14, therefore, provide for the appropriate mounting, positioning and electrical connections for the phototransistor 13 and the light-emitting diode 15.

The sensing head 3 is held in contact with the manometer tube by two spaced spring clips, such as the spring clip 17, and this permits vertical adjustment of the sensing head up and down the tube, without any need to remove the head from the tube. The angle Θ represents the angular relationship between the phototransistor 13 and the light-emitting diode 15, and this angle is optimally of the order of 144°.

As shown in FIGS. 3 and 4, the phototransistor 13 is connected to a phase-locked-loop circuit 106 which, in turn, is connected back to the light-emitting diode 15 through a feedback circuit which includes an amplifier 104. The output of the phase-locked-loop circuit is connected to a relay 109, and this relay is energized whenever the liquid in the manometer tube 2 drops below the monitored level so as to activate the indicator or alarm 7.

As shown in FIG. 3, the light source (such as the light-emitting diode 15), the photo-sensitive detector (such as the phototransistor 13), and the phase-locked-loop circuit 106 and amplifier 104 are disposed in a closed energy chain. An oscillatory signal which may, for example, be in the neighborhood of 5 kilohertz, is introduced from the phase-locked-loop circuit 106 through the amplifier 104 to the light-emitting diode 15. The pulsating light beam resulting from the light-emitting diode 15 impinges on the manometer tube 2 and reaches the phototransistor 13 where it is converted to a 5 kilohertz signal which serves to lock the phase-locked-loop circuit 106. As long as this locked condition prevails, the relay 109 is held closed.

However, when the liquid in the manometer reaches a point in which it is interposed in the optical path between the light-emitting diode and phototransistor it alters the refraction angle and thereby reduces the intensity of energy received by the phototransistor 13. The converted output signal then falls below the minimum required to maintain the locked condition of circuit 106, and the relay 109 is released. It will be appreciated that so long as the relay 109 is released, the system is operating normally, in that the manometer liquid is at the desired level. However, whenever the manometer liquid drops, so as to restore the locked condition of circuit 106 the relay 109 is energized to activate the indicator or alarm 7.

The phase-locked-loop circuit 106 represents a combination of functioning circuit elements comprising basically an electronic servo loop including a phase detector, a low pass filter, and a voltage controlled oscillator. Phase-locked-loop circuits suitable for use in the system of FIGS. 3 and 4 are presently commercially available as integrated circuits, and are presently marketed under designation NE567.

In a constructed embodiment of the invention, it was found that an increase in the manometer liquid level of one-tenth of an inch above the monitored level was sufficient to refract the light beam from the light-emitting diode 15 enough to deprive the photo-transistor 13 of sufficient excitation to maintain a locked condition in the phase-locked-loop circuit 106, so as to release the relay 109. Once that state was induced, no variations of ambient light or line voltage, or mechanical vibration, was found to be capable of restoring the locked condition. On the other hand, when the manometer liquid level was lowered by the order of one-tenth of an inch below the monitored level, the threshold signal level of the phototransistor 13 was exceeded, and the locked condition was restored within a fraction of a second to energize the relay.

In the constructed embodiment, the phototransistor 13 was of the type presently designated FPT-120, and the light-emitting diode 15 was of the type presently designated FLV104.

In the circuit of FIG. 4, the internal direct-current power supply within the housing 5 responds to the alternating current power from the power source 6 to provide a 10-volt direct-current voltage across the leads A and B of the circuit, the lead B being grounded. The phototransistor 13 has its collector connected through a potentiometer 102 to the grounded lead B. The potentiometer 102 may have a resistance, for example, of 10 kilo-ohms. The armature of the potentiometer 102 is coupled through a capacitor 103 to pin 3 of the phase-locked-loop circuit 106. The capacitor 103 may have a capacity, for example, of 0.005 microfarads.

The pin 5 of circuit 106 is connected to a resistor 104 which, in turn, is connected to pin 6, to the base of an NPN transistor 110, and to a grounded capacitor 105. The resistor 104 may have a resistance of 10 kilo-ohms, the capacitor 105 may have a capacity of 0.02 microfarads, and the transistor 110 may be of the type presently designated 2N3641.

The pin 4 of circuit 106 is directly connected to lead A, and pin 7 is directly connected to the grounded lead B. Pin 1 is connected to a grounded capacitor 108, and pin 8 is connected through the energizing coil of the relay 109 to lead A. Capacitor 107 may have a capacity of 2.0 microfarads, and capacitor 108 may have a capacity of 4.0 microfarads.

The collector of transistor 110 is directly connected to lead A, and its emitter is connected to a grounded resistor 111, and to the base of an NPN transistor 112. The resistor 111 may have a resistance of 4.7 ohms, and the transistor 112 is of the type presently designated 2N3641. The collector of the transistor 112 may be connected through a resistor 113 to the lead A, and its emitter is connected to that lead through a resistor 115. The emitter is also connected to a grounded resistor 114. The resistor 113 may have a resistance of 4.7 kilo-ohms, the resistor 114 may have a resistance of 1 kilo-ohm, and the resistor 115 may have a resistance of 1.8 kilo-ohms.

The collector of the transistor 112 is connected to the base of a PNP transistor 116. The emitter of transistor 116 is directly connected to lead A, and its collector is connected through a resistor 117 to the anode of the light-emitting diode 15, the cathode of which is grounded. The transistor 116 may be of the type designated 2N3638, and the resistor 117 may have a resistance of 62 ohms.

The resistor 104 and capacitor 105 are the frequency determining elements which establish an output frequency from the phase-locked-loop circuit at approximately 5 kilohertz. The output has a square wave shape, and it is amplified by the transistors 110, 112, 116 which, together, form the amplifier 104 of FIG. 3. Transistor 116 provides sufficient current to drive the light-emitting diode 15, which then emits light pulsations at a frequency of the order of 5 kilohertz and with a 50% duty cycle.

The potentiometer 102 permits adjustment of the sensitivity of the locking signal from the phototransistor 13. This adjustment should be made at the time of installation of the equipment, and should not be changed unless a substitution is made in the manometer liquid.

The invention provides, therefore, an improved manometer level detector of high sensitivity and high accuracy, which is capable of detecting both translucent and opaque manometer liquids of any color or density. Moreover, the level detector of the invention is simple in its construction, and economical in its fabrication.

It will be appreciated that while a particular embodiment of the invention has been shown and described, modifications may be made. It is intended in the claims to cover the modifications which come within the true spirit and scope of the invention.

What is claimed is:

1. An optical sensor for detecting when a liquid in a transparent tube drops below a particular level, said sensor comprising: a head to be mounted on said tube at the particular level; a light source mounted on said head in position to direct a beam of light through the tube when the head is mounted on the tube; an electronic circuit connected to said light source to introduce an oscillatory electric signal to said light source to cause said light source to emit a pulsating light beam; a light sensitive detector mounted on said head at a predetermined angle with respect to said light source in position to receive the pulsating light beam from said light source as refracted by the wall of the tube when the liquid in the tube drops below the predetermined level, said light sensitive detector responding to the pulsating light beam to generate a corresponding oscillatory electric signal and to introduce said last-named signal to said electronic circuit to establish a locked condition in said electronic circuit as long as the intensity of the pulsating light beam received by said light sensitive detector exceeds a predetermined threshold; and electrically energized means connected to said electronic circuit to be activated only when the aforesaid locked condition in said circuit is established.

2. The optical sensor defined in claim 1, in which said light source comprises a light emitting diode, and a lens mounted on said diode for forming a light therefrom into a beam.

3. The optical sensor defined in claim 2, in which said light emitting diode emits light in the red-infra-red region of the radiation spectrum, and in which said light sensitive detector comprises a phototransistor with a spectral sensitivity centered in the red-infra-red region of the radiation spectrum.

4. The optical sensor defined in claim 1, and which includes clip means attached to said head for mounting said head on the tube so as to permit movement of the head along the tube.

* * * * *